Figure 5:
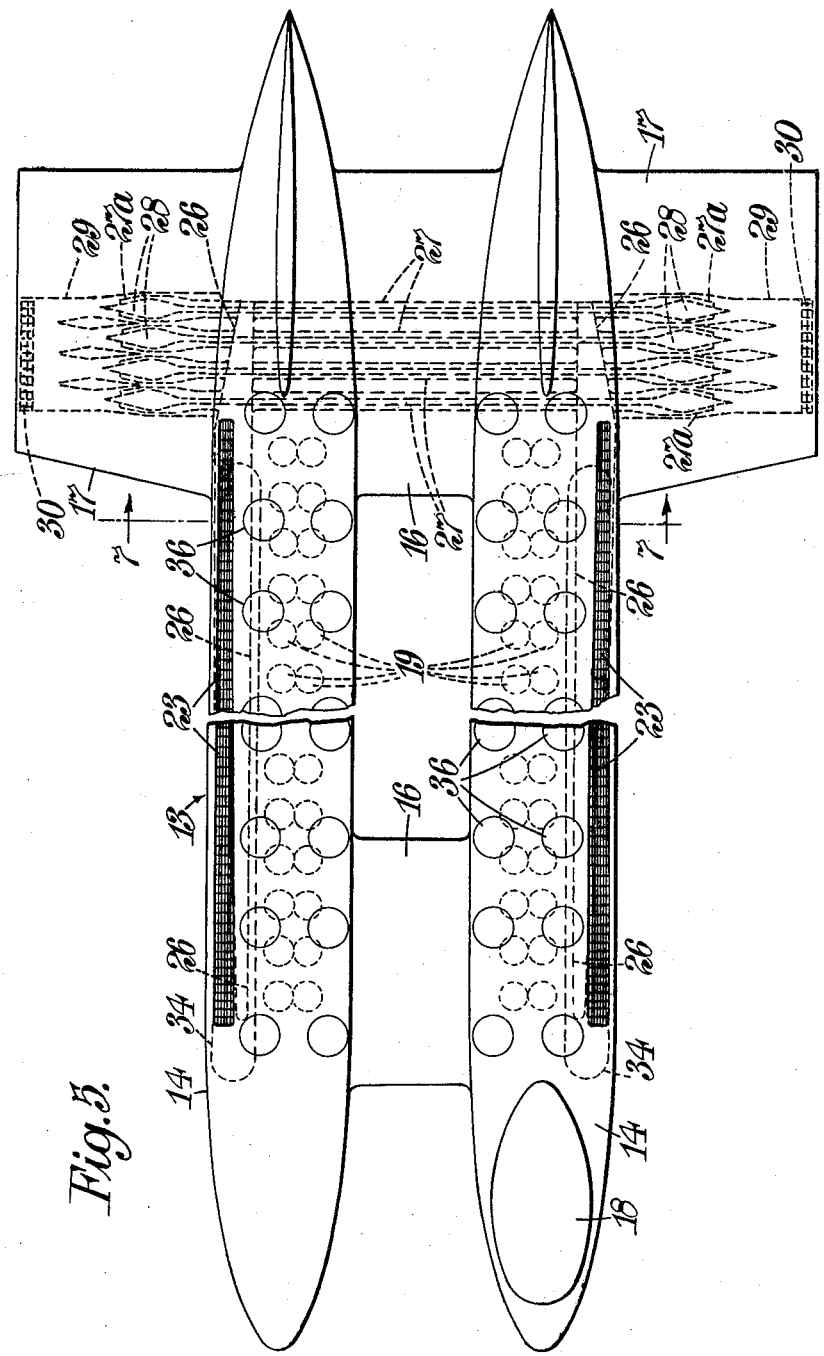

Dec. 25, 1962  A. A. GRIFFITH  3,070,326
COMPOSITE AIRCRAFT AND METHOD OF AIRCRAFT OPERATION
Filed Feb. 21, 1958  6 Sheets-Sheet 1
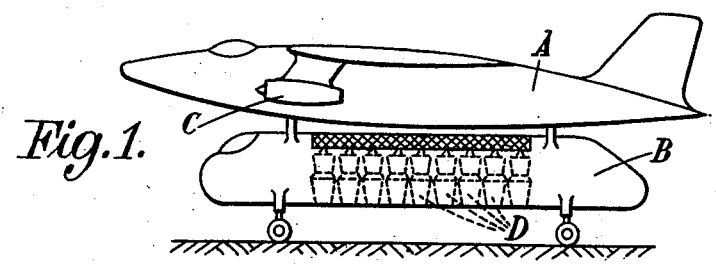
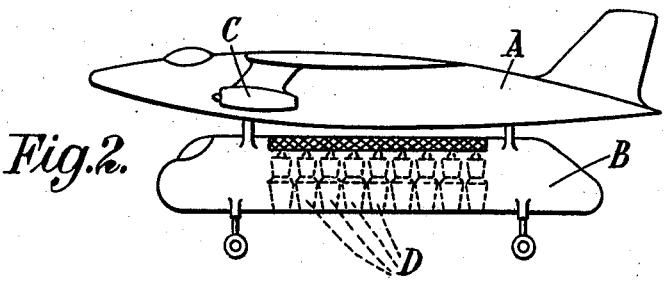
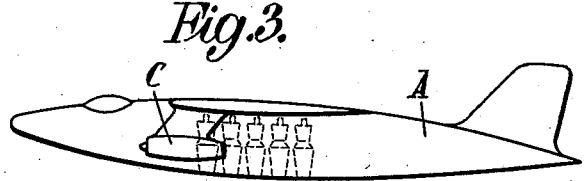
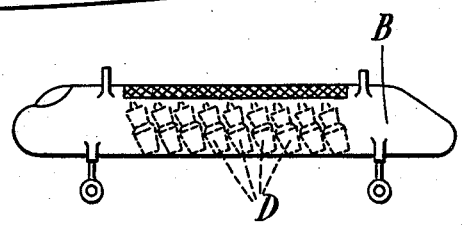
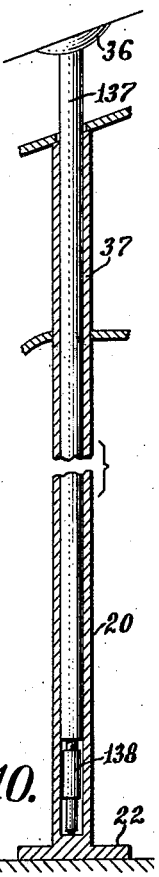

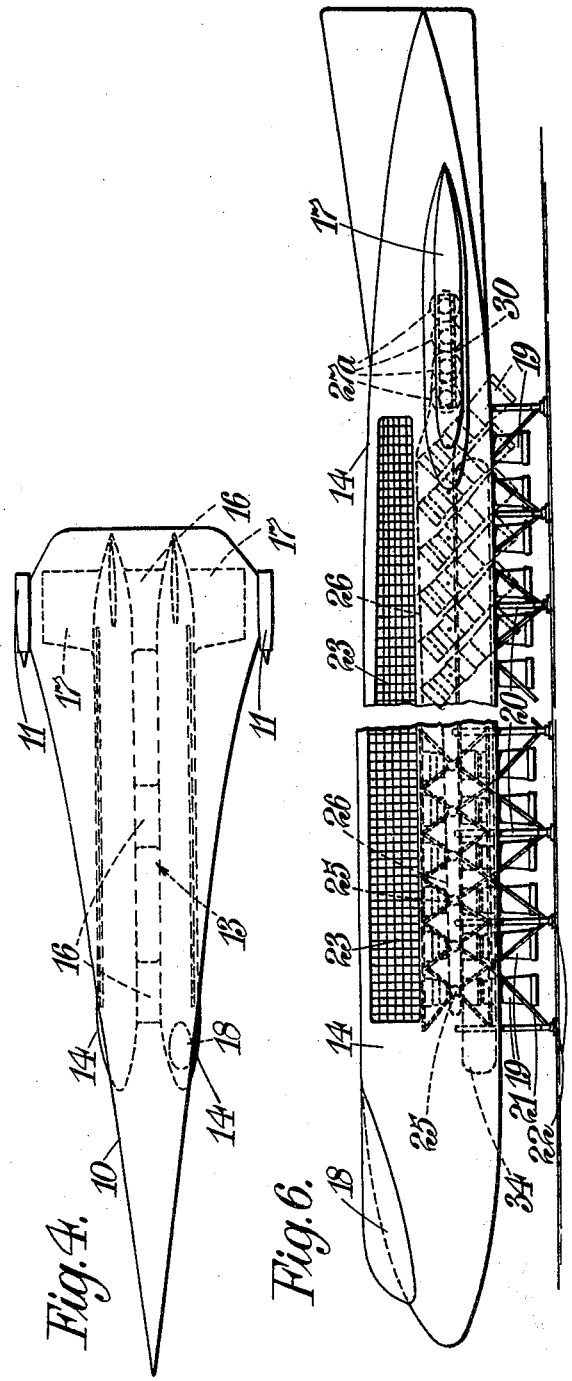

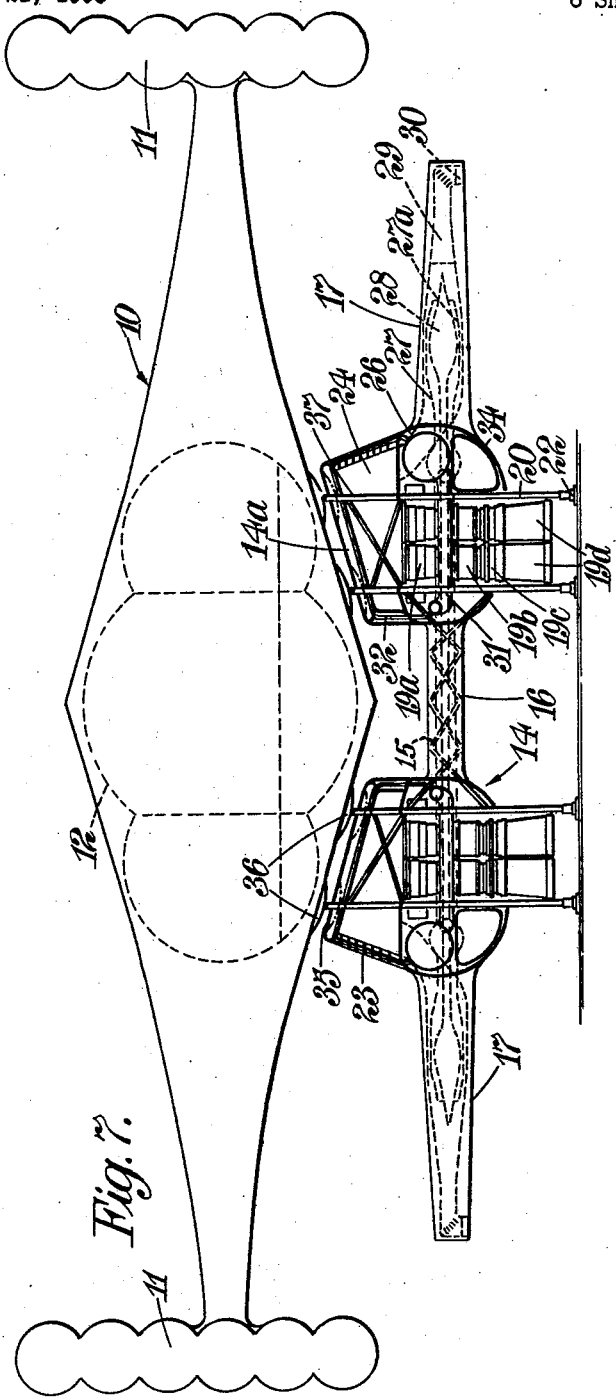

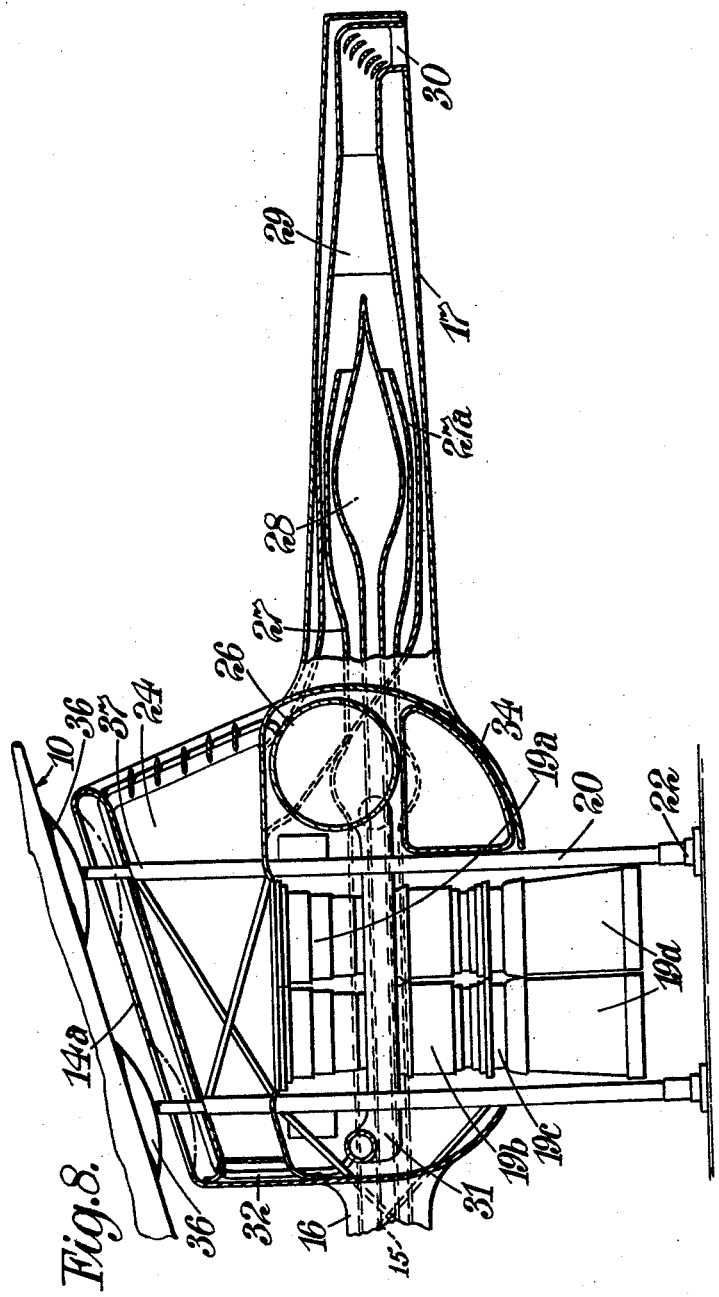

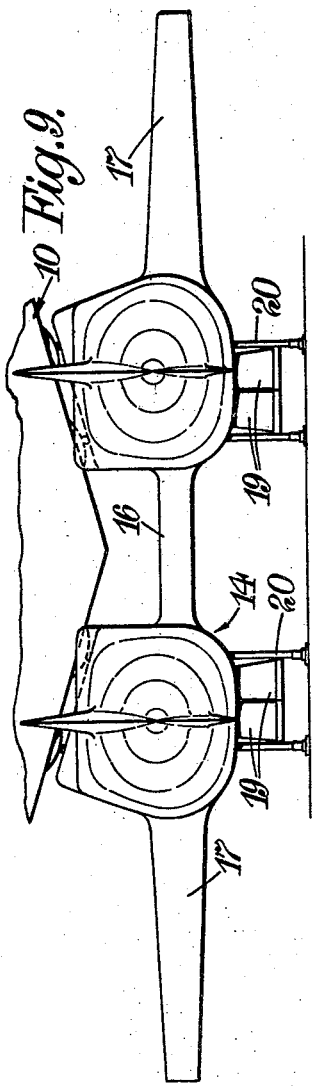

3,070,326
COMPOSITE AIRCRAFT AND METHOD OF
AIRCRAFT OPERATION
Alan Arnold Griffith, Derby, England, assignor to Rolls-Royce Limited, Derby, England, a British company
Filed Feb. 21, 1958, Ser. No. 716,625
Claims priority, application Great Britain Feb. 26, 1957
18 Claims. (Cl. 244—2)

This invention relates to methods of and means for operating aircraft and has for an object to enable the operational range or the payload to be improved.

According to the present invention in one aspect, a method of operating aircraft includes employing an operational aircraft and an auxiliary lift aircraft adapted to form with the operational aircraft a composite aircraft structure, said operational aircraft at least having propulsion means to produce forward flight and aerofoil surfaces to generate lift by such flight, and said auxiliary lift aircraft having power plant means arranged to produce lift independently of lift forces generated aerodynamically by forward flight, and further includes the steps of effecting take-off of the composite structure in a manner such that lift generated by the said power plant means of the auxiliary lift aircraft is transmitted to the operational aircraft, accelerating the composite structure to a speed at which the operational aircraft is flight supported independently of lift from the auxiliary lift aircraft, and then separating the auxiliary lift aircraft from the operational aircraft. After such separation the auxiliary lift aircraft lands.

According to a feature of this invention, the method of operating aircraft may also include the steps of homing the auxiliary lift aircraft on the operational aircraft in flight, reforming the composite aircraft structure, decelerating the composite aircraft structure whilst the operational aircraft is supported by lift generated by the power plant means of the auxiliary lift aircraft, and landing the decelerated composite aircraft structure.

According to the present invention in another aspect there is provided the combination with an operational aircraft having at least propulsion means to produce forward flight and aerofoil surfaces to generate lift by such flight, of an auxiliary lift aircraft adapted to have the operational aircraft mounted thereon to form a composite aircraft structure for take-off and initial forward flight purposes and adapted to be disconnectible from the operational aircraft in flight, the auxiliary lift aircraft having power plant means capable of producing lift independently of the lift generated aerodynamically in flight and being capable of assisting to lift the operational aircraft in take-off.

The operational aircraft may be of conventional form or, when the auxiliary lift aircraft also assists to land the operational aircraft, the latter may have no normal undercarriage.

The operational aircraft may have a power plant capable solely of producing forward flight or may also include power plant capable of generating lift independently of lift generated aerodynamically by forward flight. In the latter case the operational aircraft may be provided with an undercarriage or other form of landing gear.

In the case of the auxiliary lift aircraft, the power plant preferably comprises gas-turbine jet-propulsion engines arranged in a support structure with the lines of thrust of their associated propulsion nozzle downwardly directed.

In one construction of composite aircraft of this invention the auxiliary lift aircraft comprises twin fuselages connected together and each fuselage houses a large number of said gas-turbine jet-propulsion engines, and there are provided stub tail planes at the after ends of said fuselages, downwardly directed nozzles in said tail planes adjacent their tips, tapping means to tap air from compressors of said gas-turbine engines, ducting conveying compressed air tapped from the engines to the nozzles, and adjustable valve means associated with the nozzles and adapted on adjustment to increase the supply to the nozzles in one tail plane and simultaneously to reduce the supply to the nozzles in the other tail plane.

The invention enables the range of operational aircraft to be substantially increased or, when adequate stowage space is available, enables a higher payload to be carried.

In one particular method of operating aircraft according to this invention, two landing points are provided at a convenient distance apart. The operational aircraft has a power plant which produces forward flight only and has no undercarriage or equivalent means. The auxiliary lift aircraft is provided with jet-propulsion lift engines, is designed to be capable of a selected forward speed, and is constructed so that the operational aircraft can be mounted on it.

The aircraft composite takes off from the first landing point and, after the composite structure has risen to a suitable height and has reached a forward flight speed, the pilot of the auxiliary lift aircraft casts off from the operational aircraft and lands at the second landing point. When the operational aircraft returns it is guided as by radar onto a course joining the landing points and at a selected height, and the auxiliary lift aircraft takes-off and accelerates to a prescribed plan to bring the aircraft within visual sighting distance. The auxiliary lift aircraft then positions itself vertically below the operational aircraft, rises and makes contact with the operational aircraft to reform the composite structure which is then decelerated and landed at the first landing point under control of the auxiliary lift aircraft.

The invention is illustrated in the accompaning drawing in which:

FIGURE 1 illustrates the operational aircraft mounted on the auxiliary lift aircraft, the composite aircraft being on the ground, FIGURE 2 illustrates the composite aircraft lifted from the ground by lift generated by power plant means of the auxiliary aircraft, FIGURE 3 illustrates the operational aircraft separated from the auxiliary lift aircraft after acceleration of the composite aircraft to a speed at which the operational aircraft is flight-supported independently of lift from the auxiliary lift aircraft, FIGURE 4 is a diagrammatic plan view of a second arrangement of composite circuit, FIGURE 5 shows to a larger scale a plan view of the auxiliary lift aircraft of the composite shown in FIGURE 4, FIGURE 6 is a side elevation of FIGURE 5, FIGURE 7 is a section on the line 7—7 of FIGURE 5 drawn to a larger scale and with parts broken away, FIGURE 8 is an enlarged view of part of FIGURE 7, FIGURE 9 is a view to the same scale as FIGURE 7 of the after end of the lift aircraft, and FIGURE 10 illustrates in vertical section part of the aircraft landing gear.

In the figures the operational aircraft is indicated at A, and the auxiliary aircraft is indicated at B. The operational aircraft A has power plant means C for producing forward flight. In addition it may also include power plant means capable of generating lift independently of lift generated aerodynamically by forward flight.

The auxiliary lift aircraft has power plant means D for generating lift. The latter power plant means may be adjustable to provide a horizontal component to facilitate manoeuvering of the aircraft in the horizontal sense and/or to assist in the acceleration of the operational aircraft to a flight speed at which the operational aircraft is flight-supported.

Referring now to FIGURES 4 to 9, there is shown a second composite aircraft arrangement.

The operational aircraft 10 (FIGURE 4) is of narrow delta form and comprises a propulsion power plant consisting of two vertical banks 11 of gas-turbine jet propulsion engine, the banks of engines being arranged at the after end of the aircraft. The operational aircraft 10 has cabin accommodation indicated at 12 (FIGURE 7). The operational aircraft has no distinct fuselage structure and it is of diamond transverse cross-section (FIGURES 6 and 7) and of lenticular cross-section in the central longitudinal vertical plane. The operational aircraft 10 has no undercarriage.

The auxiliary aircraft 13 has twin fuselages 14 connected together at longitudinally spaced points by lattice cross-beam 15 enclosed in aerofoil fairings 16. At the after end of the aircraft 13, there are stub tail planes 17. A cabin with a blister window 18 is provided in one of the fuselages 14.

Each fuselage 14 is provided with landing gear comprising a series of downwardly extending legs 20 connected with the fuselage 14 through struts 21, and the legs 20 have feet 22 to contact the ground. The legs 20 preferably incorporate shock absorbers connected with the feet 22 and arranged in any known or convenient manner.

Each fuselage 14 houses a large number of gas-turbine jet-reaction engines 19 arranged in pairs. For example, each fuselage 14 may house thirty-two such engines. The engines 19 are supported to swing about horizontal axes between a first position in which the longitudinal centre lines are directed vertically downwards (full lines FIGURES 6 and 7) so that the propulsive jets issuing from them provide lift thrust only, and a second position in which the centre lines are inclined to the vertical (dotted lines FIGURE 6) and the propulsive jets issue from the engines 19 with both vertical and rearward components of velocity thereby to provide both lift thrust and propulsive thrust. The fuselages 14 are provided in their outwardly-facing side walls with air intakes 23 (FIGURES 4, 5 and 6) leading to corresponding plenum chambers 24 (FIGURE 6) extending substantially along the full length of the fuselages, and the engines have compressors 19a at their upper ends communicating with the chambers 24. The air compressed in the compressors 19a passes to combustion equipment 19b wherein fuel from fuel tanks 34 is burnt, and the products of combustion pass to turbines 19c and then to atmosphere through exhaust assemblies 19d, including propulsion nozzles, projecting from the under surface of the fuselages 14.

Pitch control of the auxiliary lift aircraft 13 is achieved by altering the throttle positions of the engines 19.

The auxiliary lift aircraft 13 is controlled laterally by downwardly-directed air jets from the ends of the tail planes 17. Air for supplying the air jets is tapped from the outlets of the compressors 19a through their trunnion mountings 25 and the tapped air is collected in ducts 26 which are divergent from their upstream ends to their downstream ends. Air from the inboard engines is conveyed to the duct 26 by ducts 31 extending across the fuselages between the pair of engines 19. The ducts 26 open at their downstream ends into a series of parallel cross-ducts 27 extending transversely across the aircraft from one tail plane 17 to the other. The cross-ducts 27 terminate at each end in a bulbous portion 27a housing a centre body 28, and the centre bodies 28 of each cross-duct 27 are secured together and are displaceable axially of the duct so as to constitute coupled valves controlling the flow from each end of the cross ducts; when the flow from one end increases the flow from the opposite end is correspondingly decreased. The cross-ducts 27 open at their ends in chambers 29 within the tail planes 17 and the chambers 29 have outlets formed by downwardly-directed rectangular nozzles 30. By displacing the centre bodies axially, the quantity of air issuing through the nozzles 30 in one tail plane is increased and the quantity of air issuing from the nozzle 30 in the other tail plane 17 is decreased.

Part of the air tapped from the compressor 19a is used for preventing or reducing ice formation on the intakes 23. For this purpose air is tapped off from the inboard ends of the ducts 31 and conveyed by ducts 32 around the exterior of the plenum chamber 24 and downwardly across the intakes 23 to the duct 26.

The upper surfaces 14a of the fuselages 14 are shaped to facilitate proper location of the operational aircraft 10 with respect to the lift aircraft 13. For this purpose, the surfaces 14a are inclined downwardly from the upper edges of the intakes towards the central longitudinal vertical plane through the aircraft 13 (FIGURES 6 and 7). The surfaces 14a have in them a series of shallow depressions 35 to receive suction cup members 36 (FIGURE 7). The cup members 36 are adjustable vertically relative to the aircraft 13 and project above the surfaces 14a until contact is made with the under surface of the operational aircraft 10 in the landing procedure. When the cup members 36 contact the operational aircraft they are locked in position, but until contact is achieved they are movable, to a limted extent, relatively to the lift aircraft 13 so that the relative positions of the lift aircraft and operational aircraft are not critical. The cup members 36 are conveniently carried by pistons 137 (FIGURE 10) working in cylinders 37 forming upward extensions of the landing legs 20 and they are connected through shock absorbers 138 with the feet 22 of the landing legs 20 so that the weight of the operational aircraft 10 is taken through the landing gear of the lift aircraft 13 directly to the ground. Suitable means is provided for creating suction in the cup members 36. When the aircraft 10, 13 are in course of mated flight in the take-off and landing procedures, the cup members 36 are lowered with respect to the position shown in FIGURE 7 to be received in the depressions 35 and the undersurface of the operational aircraft 10 is seated in the shallow trough formed by the surfaces 14a.

I claim:

1. A method of operating aircraft which includes employing an operational aircraft and an auxiliary lift aircraft adapted to form with the operational aircraft a composite aircraft structure, said operational aircraft at least having propulsion means to produce forward flight and aerofoil surfaces to generate lift aerodynamically by such flight, and said auxiliary lift aircraft having jet reaction power plant means producing vertically directable jets to develop lift independently of lift forces generated aerodynamically by forward flight, and further includes the steps of effecting take-off of the composite structure by operation of said jet reaction power plant means of the auxiliary lift aircraft, accelerating the composite structure after take off to a speed at which aerodynamic lift generated by air flow over the aerofoil surfaces is sufficient to support the operational aircraft in flight independently of lift from the auxiliary lift aircraft, deflecting said jets to produce jets inclined to the vertical and thus to produce both lift and propulsive forces to effect in part at least said acceleration, and then separating the auxiliary lift aircraft from the operational aircraft.

2. A method as claimed in claim 1, which also includes the steps of homing the auxiliary lift aircraft on the operational aircraft in flight, reforming the composite aircraft structure, decelerating the composite aircraft structure whilst operating the jet reaction power plant means of the auxiliary lift aircraft to support the composite structure, and landing the decelerated composite aircraft structure.

3. A composite aircraft structure comprising an operational aircraft having at least propulsion means to produce forward flight and aerofoil surfaces to generate lift by such flight, and an auxiliary lift aircraft whereon the operational aircraft is mounted for take-off and initial forward flight purposes, said lift aircraft being disconnectible from the operational aircraft in flight, the auxiliary lift aircraft having jet reaction power plant means producing vertically downwardly directed jets to generate lift forces sufficient to support the composite aircraft structure which lift forces are independent of the lift forces generated aerodynamically in flight by air flow over the aerofoil surfaces, thereby to lift the composite aircraft structure in take-off, said jet reaction power plant means including adjustable means to convert said vertically downward directed jets to jets directed downwardly at an angle to the vertical while the operational aircraft is mounted on the auxiliary lift aircraft.

4. A composite aircraft structure according to claim 3, wherein the operational aircraft is designed to rest directly on its fuselage.

5. A composite aircraft structure according to claim 3 wherein the operational aircraft also has a power plant capable solely of producing forward flight.

6. A composite aircraft structure according to claim 3, wherein the operational aircraft also has power plant capable of generating lift forces independently of lift generated aerodynamically by air flow over the aerofoil surfaces in forward flight.

7. A composite aircraft structure according to claim 3 wherein the power plant of the auxiliary aircraft comprises gas-turbine jet-propulsion engines arranged in a support structure with the lines of thrust of their associated propulsion nozzle downwardly directed.

8. A composite aircraft structure according to claim 7, comprising means supporting the gas-turbine jet-propulsion engines within the auxiliary aircraft to swing about horizontal axes between a first position in which the thrust lines are vertical and a second position in which the thrust lines are inclined to the vertical so that the propulsive jets have both vertical and rearward components.

9. A composite aircraft structure according to claim 7 wherein the said auxiliary lift aircraft comprises first and second fuselages, beam structure extends between and connects the fuselages together, and a large number of said gas-turbine jet-propulsion engines are mounted in each fuselage.

10. A composite aircraft structure comprising an operational aircraft having at least propulsion means to produce forward flight and aerofoil surfaces to generate lift by such flight, and an auxiliary lift aircraft whereon the operational aircraft is mounted for take-off and initial forward flight purposes, said lift aircraft being disconnectible from the operational aircraft in flight, the auxiliary lift aircraft having jet reaction power plant means producing vertically downwardly directable jets to generate lift forces sufficient to support the composite aircraft structure, which lift forces are independent of the lift forces generated aerodynamically in flight by air flow over the aerofoil surfaces, thereby to lift the composite aircraft structure in take-off, said auxiliary lift aircraft comprising first and second fuselages, beam structure extending between and connecting the fuselages, said power plant means comprising a large number of gas turbine jet-propulsion engines mounted in each fuselage, the said engines having associated propulsion nozzles whereof the lines of thrust are downwardly directed, stub tail planes at the after ends of each of said fuselages, downwardly directed nozzles in said tail planes adjacent their tips, air compressors in said gas-turbine engines, tapping means connected to tap air from the compressors, ducting connected to convey compressed air tapped from the tapping means to the nozzles, and adjustable valve means connected to control the air supply to the nozzles on adjustment to increase the supply to the nozzles in one tail plane and simultaneously to reduce the supply to the nozzles in the other tail plane.

11. A composite aircraft structure according to claim 10, comprising chambers in the tail planes, the nozzles being fed from the chambers, said ducting including crossducting extending into each tail plane and terminating at each end in a bulbous outlet portion having outlet openings into the chambers, the valve means comprising a centre body projecting through the outlet opening of each bulbous outlet portion to determine its effective outlet area, the centre bodies being secured together and being axially displaceable relative to the outlet openings to increase the area of one opening and decrease the area of the other opening.

12. A composite aircraft structure according to claim 10 comprising a plenum chamber in each of the fuselages, air intakes leading to the plenum chambers, the engines having intakes receiving air from the plenum chambers, and said ducting including ducts extending from said tapping means around the plenum chambers and across the air intakes of the plenum chambers.

13. A composite aircraft structure comprising an operational aircraft having at least propulsion means to produce forward flight and aerofoil surfaces to generate lift by such flight, and an auxiliary lift aircraft whereon the operational aircraft is mounted for take-off and initial forward flight purposes, said lift aircraft being disconnectible from the operational aircraft in flight, the auxiliary lift aircraft having jet reaction power plant means producing vertically downwardly directable jets to generate lift forces sufficient to support the composite aircraft structure, which lift forces are independent of the lift forces generated aerodynamically in flight by air flow over the airfoil surfaces, thereby to lift the composite aircraft structure in take-off, said auxiliary lift aircraft comprising first and second fuselages, beam structure extending between and connecting the fuselages, said power plant means comprising a large number of gas turbine jet-propulsion engines mounted in each fuselage, the said engines having associated propulsion nozzles whereof the lines of thrust are downwardly directed, each fuselage comprising landing gear including a series of downwardly projecting legs having feet to contact the ground and also comprising means supported directly from the landing gear and engaging the operational aircraft whereby when the composite aircraft structure is on the ground the weight of the operational aircraft is transmitted directly through the landing gear to the ground.

14. A composite aircraft structure according to claim 13, wherein said means to engage the operational aircraft projects above the fuselages, are movable vertically relative to the fuselages, and are connected to transmit the weight of the operational aircraft to the landing gear.

15. A composite aircraft structure according to claim 14, wherein the said means comprises cylinders forming upward extensions of the legs of the landing gear pistons sliding in the cylinders and shock absorbers connecting the pistons to the feet of the landing gear.

16. A composite aircraft structure according to claim 13, wherein said means for engaging the operational aircraft comprises suction cup members adapted to engage the undersurface of the operational aircraft.

17. A composite aircraft structure according to claim 13 wherein said means adapted to engage the operational aircraft is movable to a limited extent relatively to the lift aircraft, and includes locking means preventing such limited movement after engagement with the operational aircraft.

18. A composite aircraft structure comprising an operational aircraft having at least propulsion means to produce forward flight and aerofoil surfaces to generate lift by such flight, and an auxiliary lift aircraft whereon the operational aircraft is mounted for take-off and initial forward flight purposes, said lift aircraft being disconnectible from the operational aircraft in flight, the auxiliary lift aircraft having jet reaction power plant means producing vertically downwardly directable jets to generate lift forces sufficient to support the composite aircraft structure, which lift forces are independent of the lift forces generated aerodynamically in flight by air flow over the aerofoil surfaces, thereby to lift the composite aircraft structure in take-off, said auxiliary lift aircraft having landing gear and means supporting the operational aircraft directly mounted on the landing gear whereby the weight of the operational aircraft is taken directly through the landing gear to the ground.

References Cited in the file of this patent

UNITED STATES PATENTS

| | | |
|---|---|---|
| 1,928,578 | Turrell | Sept. 26, 1933 |
| 2,062,599 | North | Dec. 1, 1936 |
| 2,471,599 | Young | May 31, 1949 |
| 2,589,732 | Riviere | Mar. 18, 1952 |
| 2,653,777 | Barkey | Sept. 29, 1953 |
| 2,774,554 | Ashwood | Dec. 18, 1956 |
| 2,843,337 | Bennett | July 15, 1958 |

OTHER REFERENCES

Flight, pp. 134–135, Feb. 4, 1955.
Aviation Week, Nov. 21, 1955 (page 28 relied on).